(12) United States Patent
Arena

(10) Patent No.: US 8,078,051 B2
(45) Date of Patent: Dec. 13, 2011

(54) METHOD AND SYSTEM FOR A SECURE BI-DIRECTIONAL LINE SWITCHED RING

(75) Inventor: Scott David Arena, Peabody, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 855 days.

(21) Appl. No.: 11/615,397

(22) Filed: Dec. 22, 2006

(65) Prior Publication Data

US 2008/0152346 A1  Jun. 26, 2008

(51) Int. Cl.
*H04B 10/00* (2006.01)
*H04J 14/00* (2006.01)

(52) U.S. Cl. ................................. 398/8; 398/4

(58) Field of Classification Search .............. 398/3, 4, 398/8
See application file for complete search history.

(56) References Cited

U.S. PATENT DOCUMENTS

| | | | |
|---|---|---|---|
| 6,298,038 B1* | 10/2001 | Martin et al. | 370/216 |
| 7,023,881 B1* | 4/2006 | Bendak et al. | 370/470 |
| 7,145,882 B2* | 12/2006 | Limaye et al. | 370/258 |
| 2003/0210908 A1* | 11/2003 | Levy et al. | 398/33 |
| 2004/0190901 A1* | 9/2004 | Fang | 398/59 |
| 2005/0111843 A1* | 5/2005 | Takeuchi et al. | 398/38 |
| 2006/0098660 A1* | 5/2006 | Pal et al. | 370/395.51 |
| 2007/0211761 A1* | 9/2007 | Klish | 370/477 |

* cited by examiner

*Primary Examiner* — Nathan Curs

(57) ABSTRACT

A method or system including implementing one or more indicators to specify traffic ordering associated with an optical networking protocol and ordering traffic according to the one or more indicators.

15 Claims, 5 Drawing Sheets

| Traffic Ordering Clockwise Direction | | | Traffic Ordering Counter-Clockwise Direction | | |
|---|---|---|---|---|---|
| | Timeslot 12 | Pro-tection | | Timeslot 12 | Pro-tection |
| | Timeslot 11 | Pro-tection | | Timeslot 11 | Pro-tection |
| | Timeslot 10 | Pro-tection | | Timeslot 10 | Pro-tection |
| | Timeslot 9 | Pro-tection | | Timeslot 9 | Pro-tection |
| | Timeslot 8 | Pro-tection | | Timeslot 8 | Pro-tection |
| | Timeslot 7 | Pro-tection | | Timeslot 7 | Pro-tection |
| | Timeslot 6 | Data | | Timeslot 6 | Data |
| | Timeslot 5 | Data | | Timeslot 5 | Data |
| | Timeslot 4 | Data | | Timeslot 4 | Data |
| | Timeslot 3 | Data | | Timeslot 3 | Data |
| | Timeslot 2 | Data | | Timeslot 2 | Data |
| | Timeslot 1 | Data | | Timeslot 1 | Data |

| Traffic Ordering Clockwise Direction | | |
|---|---|---|
| Timeslot 12 | Protection |
| Timeslot 11 | Data |
| Timeslot 10 | Protection |
| Timeslot 9 | Data |
| Timeslot 8 | Protection |
| Timeslot 7 | Data |
| Timeslot 6 | Protection |
| Timeslot 5 | Data |
| Timeslot 4 | Protection |
| Timeslot 3 | Data |
| Timeslot 2 | Protection |
| Timeslot 1 | Data |

| Traffic Ordering Counter-Clockwise Direction | | |
|---|---|---|
| Timeslot 12 | Data |
| Timeslot 11 | Protection |
| Timeslot 10 | Data |
| Timeslot 9 | Protection |
| Timeslot 8 | Data |
| Timeslot 7 | Protection |
| Timeslot 6 | Data |
| Timeslot 5 | Protection |
| Timeslot 4 | Data |
| Timeslot 3 | Protection |
| Timeslot 2 | Data |
| Timeslot 1 | Protection |

Figure 3

METHOD AND SYSTEM FOR A SECURE BI-DIRECTIONAL LINE SWITCHED RING

BACKGROUND INFORMATION

Optical fiber is an increasingly popular transmission medium and is known to be more secure than traditional wireline media or wireless transmission. However, it is still possible to intercept synchronous optical networking (SONET) signals or other optical transmissions by conventional means. Additionally, it is possible to tap optical fiber by bending the optical fiber to a point where the signal has been attenuated but not terminated. This may enable the collection of scattered optical transmissions (i.e., the signal). The transmissions can then be analyzed providing unauthorized access. Collected transmissions may be re-assembled into standard synchronous optical networking (SONET) structures and used by a hacker to gain information.

BRIEF DESCRIPTION OF THE DRAWINGS

In order to facilitate a fuller understanding of the exemplary embodiments of the present inventions, reference is now made to the appended drawings. These drawings should not be construed as limiting, but are intended to be exemplary only.

FIG. 2 illustrates an exemplary method of traffic ordering in a bi-directional switched line ring based optical network.

FIG. 3 illustrates a method of traffic ordering in a bi-directional switched line ring based optical network, according to an embodiment of the disclosure.

DETAILED DESCRIPTION OF PREFERRED EMBODIMENTS

A system and process of an exemplary embodiment provides a method and a system of providing increased security for optical networks. A secure bi-directional line switched ring may allow the implementation of one or more security protocols or signal structures using unused control bits in the overhead of one or more optical networking protocols. The one or more security protocols may allow altering the traffic ordering of the network from a standard implementation of an optical networking protocol. The one or more security protocols may additionally enable the encryption of payload data at one or more levels of encryption.

The secure bi-directional line switched ring may also provide a system and method for detecting signal attenuation between two or more nodes. This method for detecting increased signal attenuation may be used to trigger a protection switch in one or more embodiments. The protection switch may be used to alter traffic ordering on a network. The protection switch may also be used to alter a level of encryption on a network.

The increased security offered by a secure bi-directional line switched ring may be desirable for government applications, military applications, networks carrying financial data, and/or networks carrying medical data. It may have additional applications wherever increased network security and integrity are desired.

Figure 1:
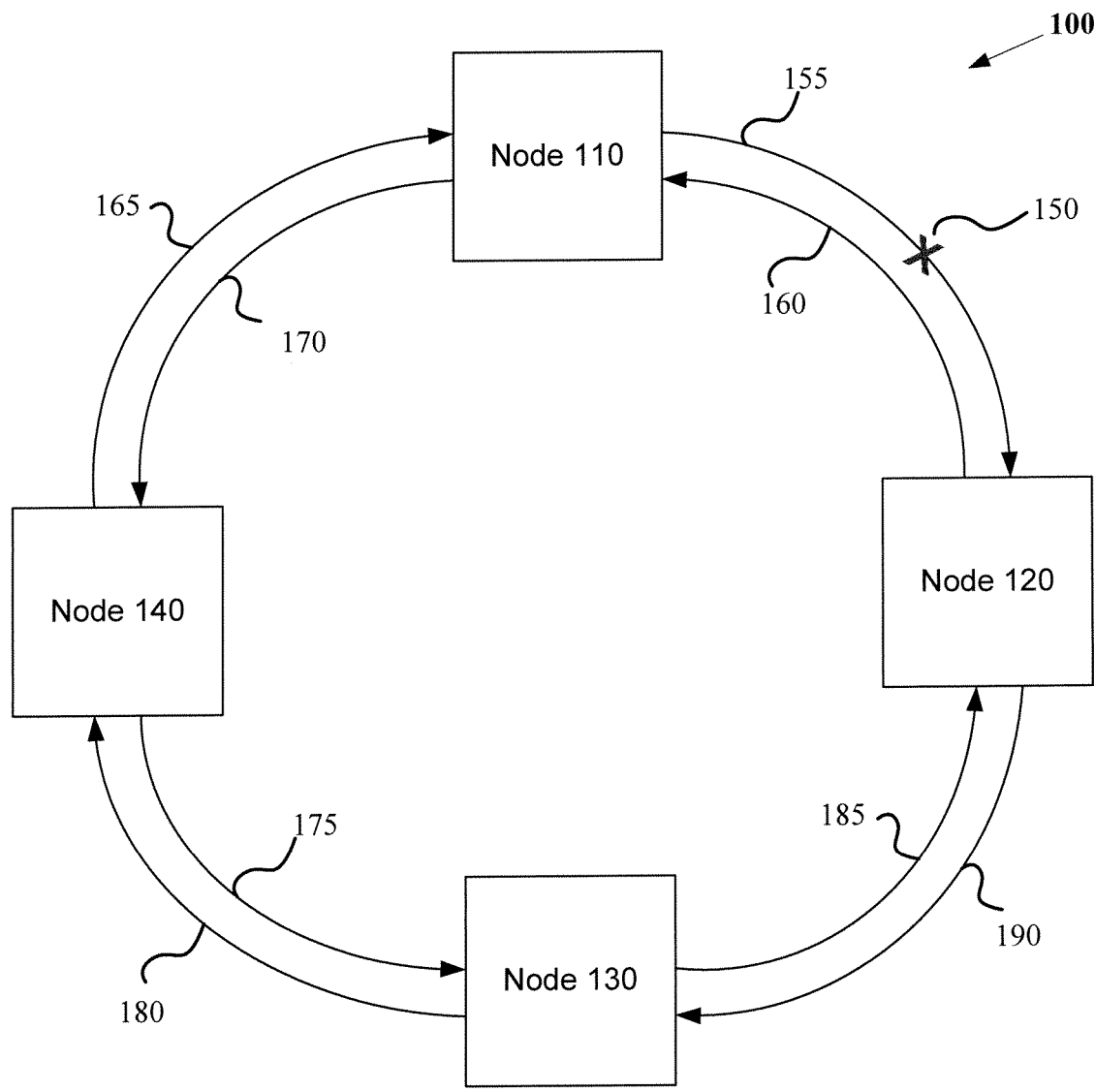
FIG. 1 illustrates an exemplary optical networking system implementing a bi-directional switched line ring, according to an embodiment of the disclosure.

FIG. 1 is an exemplary optical networking system 100 implementing a bi-directional switched line ring, according to an embodiment of the disclosure. System 100 illustrates an exemplary system for increasing network security on an optical network. As illustrated, Network Node 110 may be connected by Fiber Connection 155 to Network Node 120 and by Fiber Connection 170 to Network Node 140. Network Node 120 may connect to Network Node 130 using Fiber Connection 190 and to Network Node 110 using Fiber Connection 160. Network Node 130 may connect to Network Node 140 using Fiber Connection 180 and to Network Node 120 using Fiber Connection 185. Network Node 140 may connect to Network Node 110 using Fiber Connection 165 and to Network Node 130 using Fiber Connection 175. Network Protection Event 150 may indicate the location of a hypothetical network protection event such as a break in Fiber Connection 155 or an increased level of signal attenuation on Fiber Connection 155. The Network Protection Event 150 may trigger a protection switch.

Nodes may be connected by two fibers (as illustrated in FIG. 1), 4 fibers or other configurations. In configurations with pairs of fibers, one fiber of each pair may be configured to send traffic in a single direction around the ring, such as clockwise around a ring. The other fiber of a pair may be configured to send traffic the opposite way around the ring such as counter-clockwise around the ring. In FIG. 1, the arrows indicate that an outer ring composed of Fiber Connections 155, 190, 180 and 165 is sending data clockwise around the ring. An inner ring composed of Fiber Connections 170, 175, 185 and 160 is illustrated in FIG. 1 sending data counter-clockwise around the ring.

The various components of system 100 may be further duplicated, combined and/or integrated to support various applications and platforms. Additional elements may also be implemented in the system to support various applications. For example, additional nodes may be added to the system and additional fiber connections may be added connecting additional nodes.

System 100 may be an optical network. For example, the optical network may be a synchronous optical networking (SONET) based network implementing Bi-Directional Line Switched Ring. System 100 may be implemented using a standard such as Telecordia's GR-1230 standard. In other embodiments, System 100 may be a synchronous digital hierarchy (SDH) based optical network.

Network Nodes 110, 120, 130 and 140 may be network nodes on a synchronous optical networking (SONET) Bi-Directional Line Switched Ring network. The network may use multiplexed timeslots to allocate channels in the bandwidth. The network may be implemented using traffic ordering so that half of the multiplexed timeslots in each direction may be utilized for data and the other half of the multiplexed timeslots may be reserved for protection in case of an outage. As is illustrated in FIG. 2, this may be implemented by utilizing the first half of the timeslots for data in each direction. In the example of FIG. 2, the bandwidth may be an Optical Carrier level 12 (OC-12) and timeslots 1-6 in the clockwise and counter-clockwise directions around the ring may be utilized for carrying data traffic. Timeslots 7-12 may be reserved for protection in the event of an outage. If a protection event 150 occurs such as a break or disruption in Fiber Connection 155, the reserved timeslots 7-12 in the counter-clockwise direction around the ring may be utilized to carry network traffic originally transported in timeslots 1-6 in the clockwise direction. Node 110 may cease sending data on Fiber Connection 155 and network performance may remain consistent. This traffic ordering scheme may be implemented for any other Optical Carrier level (OC-n) (e.g., Optical Carrier level (OC) 3, Optical Carrier level (OC) 12, Optical Carrier level (OC) 48, Optical Carrier level (OC) 192, etc.).

By way of non-limiting example, a secure bi-directional line switched ring may be implemented. Each frame of data in synchronous optical networking (SONET) based network may contain a certain amount of control data as well as payload data. A secure bi-directional line switched ring may be implemented by defining one or more security protocols implemented in unused overhead bits of a standard such as Telecordia GR-1230. In one or more embodiments, the traffic ordering may be signaled in two or more unused bits in the overhead of a synchronous optical networking (SONET) bi-directional line switched ring implementation. The traffic ordering may specify which of the multiplexed timeslots may be dedicated for data traffic and which may be reserved for protection. Timeslots reserved for protection may be used to carry data in the event of a protection switch. The two or more bits may indicate which of a predetermined set of traffic ordering scheme is implemented on the ring. Alternatively, one bit may be used and there may only be one alternate traffic ordering pattern. The one bit may indicate if the protocol depicted in FIG. 2 is used or if a predetermined alternate traffic ordering scheme is used. A bit may also be used to vary between any two traffic ordering schemes. Increasing the number of bits used may allow an increasing number of traffic ordering schemes to be specified.

For example, in a first alternate traffic ordering, two unused control bits of overhead may be set to "00" and it may signal that traffic ordering may be altered as depicted in FIG. 3. In FIG. 3, an Optical Carrier level 12 (OC-12) may contain multiplexed timeslots 1, 3, 5, 7, 9 and 11 which may be used to carry data traveling clockwise around the ring, for example from Node 110 to Node 120. Timeslots 2, 4, 6, 8, 10 and 12 may be reserved for protection in the clockwise direction. Timeslots 2, 4, 6, 8, 10 and 12 in the counter-clockwise direction may be used to carry data. Timeslots 1, 3, 5, 7, 9 and 11 may be reserved for protection in the counter-clockwise direction. Thus data may no longer be ordered among contiguous timeslots as depicted in FIG. 2 (see timeslots 1-6 of FIG. 2). Data ordered in non-contiguous timeslots may make it harder for a hacker to distinguish valid payload when intercepting data. Additionally, pseudo random data may be transmitted on protection channels (i.e., timeslots reserved for protection). The pseudo random data may be ignored by receiving nodes so that it may not increase their workload. The pseudo random data may however add to the level of protection by increasing the level of difficulty for a hacker attempting to decipher intercepted data.

If a protection event 150 is detected, such as a break in Fiber Connection 155 or unacceptable levels of attenuation in Fiber Connection 155, a protection switch may result. The protection switch may cause data formerly traveling clockwise on Timeslots 1, 3, 5, 7, 9 and 11 to travel counter-clockwise around the ring and may utilize Timeslots 1, 3, 5, 7, 9 and 11 in the counter-clockwise direction. Protection event 150 may be the result of a hacker attempting to intercept data. According to one or more embodiments, pseudo random data may be sent on Timeslots 1, 3, 5, 7, 9 and 11 in the clockwise direction after a protection event is detected. The pseudo random data may prevent the hacker from realizing that they have been detected and may provide additional time to locate the source of the intrusion and the hacker. In the above example, any real payload data from Node 110 to Node 120 may travel counter-clockwise around the ring after protection event 150 has been detected and thus may avoid interception. Therefore, any data intercepted may be minimized to non-contiguous data sent on Timeslots 1, 3, 5, 7, 9 and 11 traveling clockwise between Node 110 to Node 120 for the short period of time before protection event 150 was detected.

According to one or more embodiments, multiple traffic ordering schemes may be implemented. Depending on the setting of control bits different traffic ordering schemes may be followed by the nodes in the ring. The traffic ordering may be varied among several alternate schemes. Traffic ordering may be fixed to a particular ordering scheme, it may be altered randomly in response to a control signal, or it may be altered in response to a protection switch. For example, traffic ordering may also be implemented as depicted in FIG. 2 and switched to an alternate scheme in response to a protection switch. For example, other alternate traffic ordering schemes may include: a reverse alternating scheme in which traffic traveling clockwise may be sent on Timeslots 11, 9, 7, 5, 3 and 1 with the remaining clockwise timeslots reserved for protection and traffic traveling counter-clockwise on Timeslots 12, 10, 8, 6, 4 and 2 with the remaining counter-clockwise timeslots reserved for protection; an inverse alternating scheme in which traffic traveling clockwise may travel on Timeslots 1, 4, 5, 8, 9 and 12 with the remaining clockwise timeslots reserved for protection and traffic may travel counter-clockwise on Timeslots 2, 3, 6, 7, 10 and 11 with the remaining counter-clockwise timeslots reserved for protection; and a mixed alternating scheme in which traffic traveling clockwise may travel on Timeslots 1, 12, 3, 10, 5 and 8 with the remaining clockwise timeslots reserved for protection and traffic traveling counter-clockwise may travel on timeslots 2, 11, 4, 9, 6 and 7 with the remaining counter-clockwise timeslots reserved for protection. The alternating scheme may be signaled in two or more unused control bits of a bi-directional line switched ring protocol. For example, 2 bits set to "00" may indicate a basic alternating pattern, two bits set to "01" may indicate the reverse alternating pattern, two bits set to "10" may indicate the inverse alternating pattern and two bits set to "11" may indicate the mixed alternating pattern. In one or more of these traffic ordering patterns protection timeslots may be used for extra data traffic but data transmitted on protection channels may not have an alternate timeslot in the case of a protection switch. Other traffic ordering patterns and/or control signals may be utilized. The patterns listed above may be signaled by other control signals.

Additionally, according to one or more embodiments encryption may be implemented using one or more unused overhead control bits. For example, two bits may be used to signal a level of encryption used for payload data. Encryption signals may include "00" for no encryption, "01" for data encryption standard (DES) 56 bit encryption and "10" for data encryption standard (DES) 128 bit encryption. The signal "11" may be reserved and may indicate an alternate mode of encryption. Other encryption modes and signals may be used. A system may initially be provisioned with no encryption or a low level of encryption and may increase the level of encryption utilized in response to a protection switch. A system may also initially be provisioned with a high level of encryption.

In some embodiments, overhead control bits of a networking protocol, such as synchronous optical networking (SONET) based K-bits of line overhead, may continue to implement ring switching consistent with some standards, however additional criteria may specify implementing traffic ordering and/or encryption as discussed above. In one or more embodiments, control bits for traffic ordering and/or encryption may be contained in line data communication channel (DCC) bytes D4-D12, in Path User Channel Byte F2, or in synchronous optical networking (SONET) telecommunication standard path overhead bytes Z3 and Z4.

Although FIGS. 2 and 3 used the timeslots or in some embodiments Synchronous Transport Signal level 1 (STS-1) channels of an Optical Carrier level 12 (OC-12), the alternating traffic ordering is contemplated on other bandwidths including an Optical Carrier level 3 (OC-3), an Optical Carrier level 24 (OC-24), an Optical Carrier level 48 (OC-48), an Optical Carrier level 96 (OC-96), an Optical Carrier level 192 (OC-192), an Optical Carrier level 768 (OC-768) and other bandwidths and formats. Encryption may be implemented on other bandwidths and formats as well, including an Optical Carrier level 1 (OC-1), an Optical Carrier level 3 (OC-3), an Optical Carrier level 24 (OC-24), an Optical Carrier level 48 (OC-48), an Optical Carrier level 96 (OC-96), an Optical Carrier level 192 (OC-192), an Optical Carrier level 768 (OC-768) and others.

One or more embodiments of the disclosure, may be implemented as a security protocol module. The security protocol module may implement one or more security protocols as control signals in the overhead of data frames, packets or other structures of a network protocol. The security protocol module may implement one or more security protocols to manage traffic ordering, to manage encryption of payload data, to measure signal attenuation, or for other network security or network management purposes. The security protocol module may be implemented at one or more nodes or at any other network element.

Figure 4:
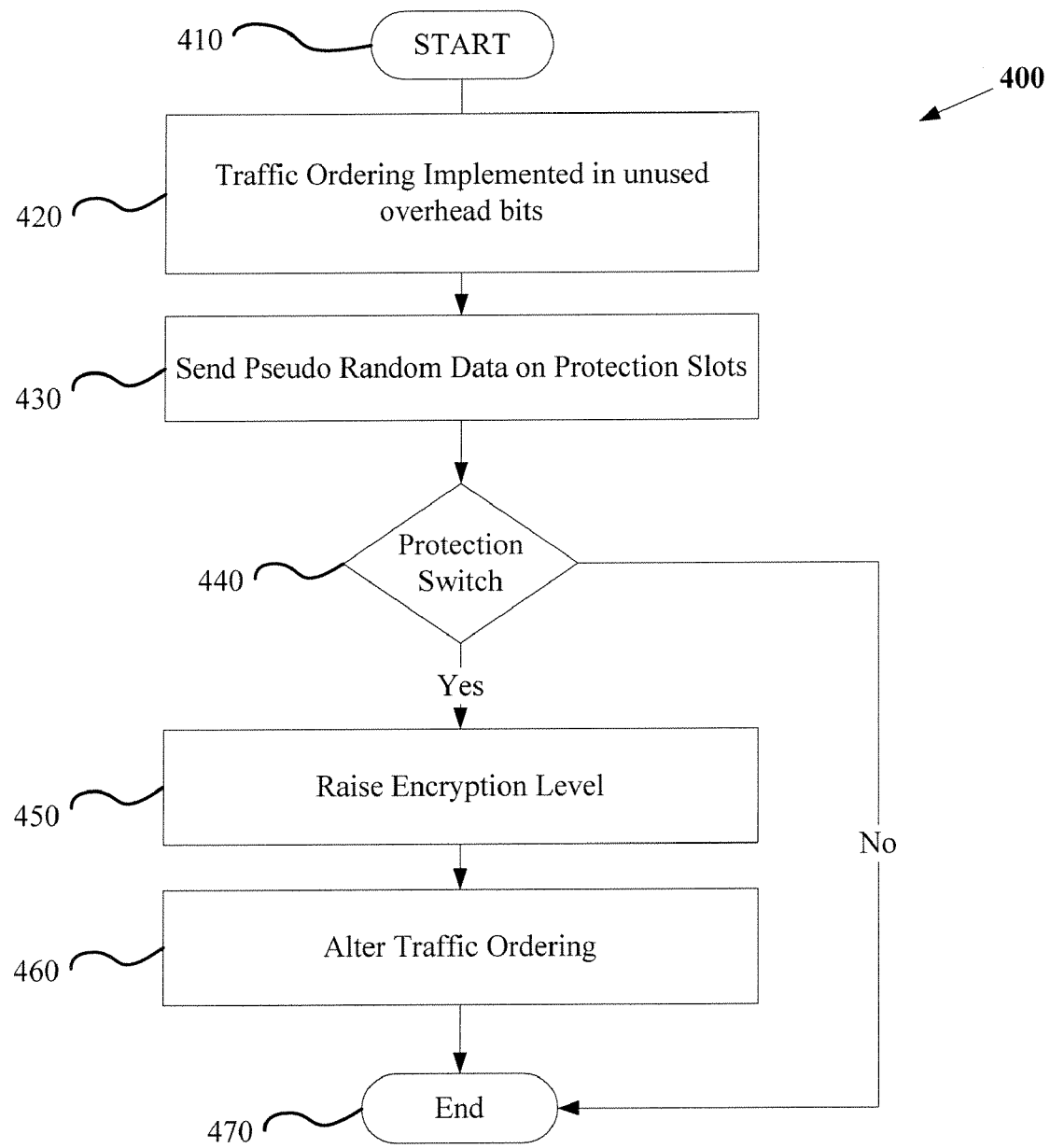
FIG. 4 illustrates a flowchart depicting a method of securing data on an optical network according to an embodiment of the disclosure.

FIG. 4 is a flowchart depicting a method of securing data on an optical network according to an embodiment of the disclosure. According to one or more embodiments, flowchart 400 may begin at block 410.

At block 420, traffic ordering may be implemented in unused overhead control bits of a synchronous optical networking (SONET) standard. The traffic ordering may include varying timeslots, or in some embodiments Synchronous Transport Signal level 1 (STS-1) channels, used to carry data and those reserved for protection. The traffic ordering schemes may be predetermined and may be signaled by one or more signals in one or more unused control bits of a synchronous optical networking (SONET) standard. Also, one or more unused control bits may indicate whether traffic ordering implements a specified traffic ordering scheme or implements an agreed upon alternate.

At block 430, pseudo random data may be sent on protection time slots or channels. The pseudo random data may contain no information of value or nonsensical data and may serve as a decoy significantly increasing the level of difficulty for a hacker attempting to intercept valid payload data. The level of difficulty may be increased because the traffic ordering may be a modified ordering which may be difficult to predict. The pseudo random data may be ignored by receiving nodes.

At block 440, the method may determine whether a protection switch has been received. A protection switch may be triggered if a loss of signal is detected due to a break in the fiber or if the signal attenuation increases beyond a specified threshold. In one or more embodiments the threshold may be approximately 1.5 decibels. If a protection switch is detected, the flow may continue at block 450. If a protection switch is not detected, the flow may end at block 470.

At block 450, the encryption level may be raised. The protection level may be raised in response to a protection switch. For example, if the system was initially implemented with no encryption, encryption may be raised to data encryption standard (DES) 56 bit encryption. If the original implementation encrypted payload data at the data encryption standard (DES) 56 bit level, the detection of a protection switch may raise the encryption to the data encryption standard (DES) 128 bit level. Other encryption levels may be used. Also, control of the encryption level may be signaled in unused overhead control bits.

At block 460, traffic ordering may be altered. The traffic ordering may be altered, in response to a signal sent in unused overhead control bits. The signal may be sent in response to a protection switch, in response to a periodic switching of traffic ordering schemes or for any other reason. Traffic ordering may send data in each direction around a ring as depicted in FIG. 3, in one of several different traffic ordering schemes as discussed previously, or in any other scheme. Traffic ordering altered in response to a protection switch may send all data traffic in the opposite direction around the ring from cause of the protection switch using the protection timeslots to accommodate data previously sent in the other direction. For example, if a cause of the protection switch is detected on the clockwise side of the ring, data traffic on the counter-clockwise side may continue as normal and data traffic formerly sent on the clockwise side may be sent in the protection time slots on the counter-clockwise side. The system may send pseudo random data on the former data channels of the clockwise side of the ring. The protection switch from the clockwise side to the counter-clockwise side may occur in 50 milliseconds or less. At block 470, the method may end.

Figure 5:
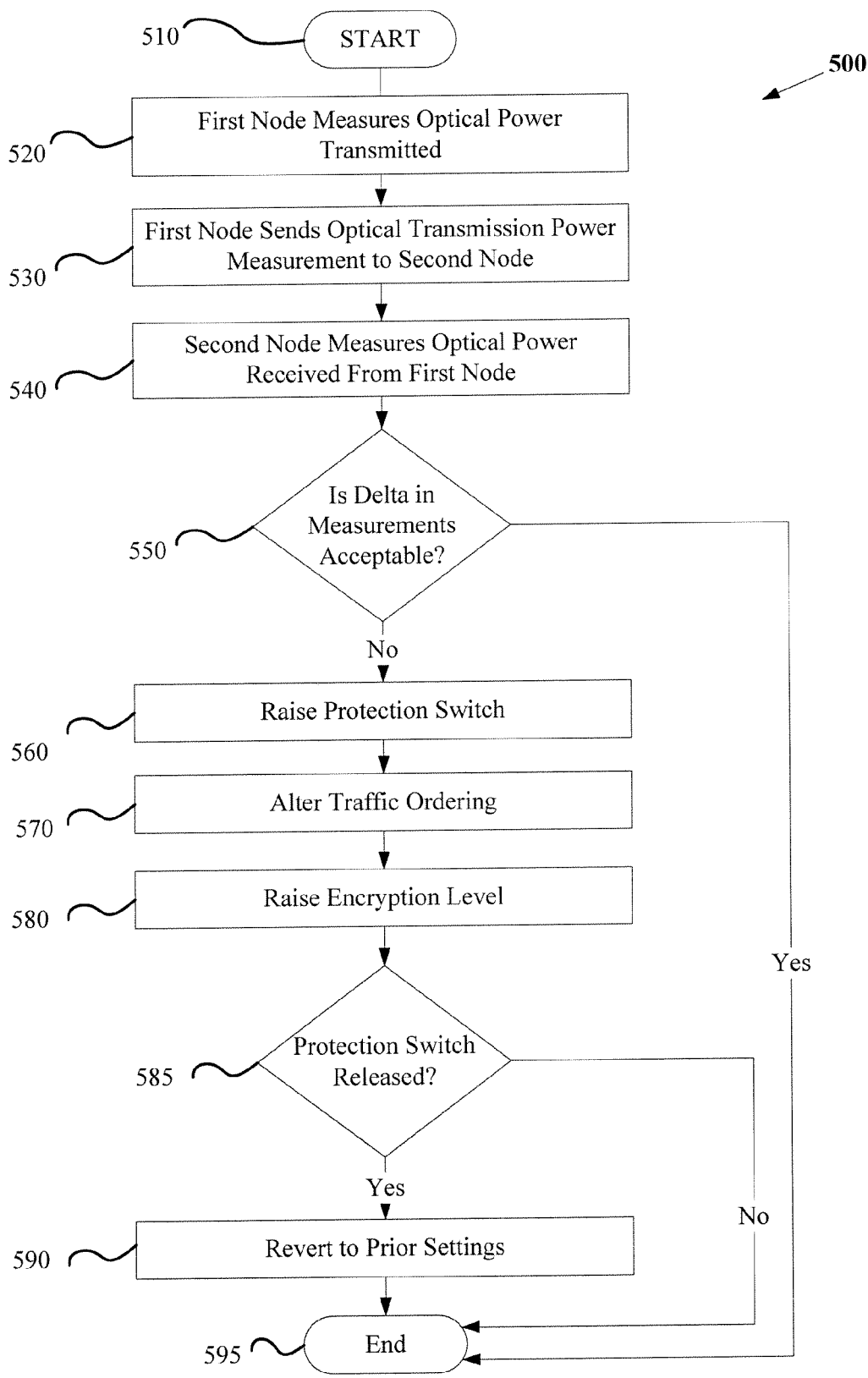
FIG. 5 illustrates a flowchart depicting a method of detecting and responding to an increase in attenuation in an optical network, according to an embodiment of the disclosure.

According to one or more embodiments, events causing protection switches may be monitored by measuring signal attenuation. This may include comparing signal attenuation against a known signal transmission strength. FIG. 5 depicts a method of detecting and responding to an increase in attenuation in an optical network, according to an embodiment of the disclosure. According to one or more embodiments, flowchart 500 may begin at block 510.

At block 520, a first node may measure optical power transmitted to a second node. At block 530, the first node may send the optical transmission power measurement to the second node. The first node may use one or more unused overhead bits in a networking protocol to transmit the optical transmission power measurement to the second node. For example, the first node may use six bits. One bit may indicate the sign (positive or negative) and five bits may indicate the level of the optical power transmission. At block 540, the second node may measure optical power received from a second node. It may do so continuously, periodically, in response to a signal received or according to other patterns.

At block 550, the second node may calculate the delta of the received signal from the optical transmission power measurement sent by the first node. The second node may determine if the delta between the two measurements exceeds a specified threshold the second node may find the delta unacceptable. In one or more embodiments, the threshold may be 1.5 decibels. If the delta is acceptable flow may end at block 595. In other embodiments, both measurements may be received by a third device and the third device may evaluate the delta.

At block 560, the second node may trigger a protection switch. In some embodiments, the node may do this by setting the appropriate K-bits according to the synchronous optical networking (SONET) standard. At block 570, the traffic ordering may be altered as a result of the protection switch. The protection switch may result in all data traffic from an affected portion of the ring traveling the opposite direction and may utilize reserved timeslots on the other side of the ring. The protection switch may result in nodes sending pseudo random data on the former data timeslots of the affected side of the ring. In some embodiments, in addition to the protection switch, the traffic ordering may be altered to a different pattern.

At block 580, the encryption level implemented in the network may be raised in response to the protection switch. The data at the payload level may be now encrypted if not initially configured as encrypted or the encryption level may be raised if initially configured as encrypted.

At block 585, the method may check to see if the protection switch is released. In some embodiments, it may do so by checking K-bits in the overhead control bits according to the synchronous optical networking (SONET) standard. If the protection switch has been released it may proceed to block 590. If not the method may end at block 595. At block 590, the method may revert to prior settings if the protection switch has been released. This may include reverting the traffic flow so that it now travels both directions around the ring. It may also include lowering the encryption level. Reverting to prior settings may include reverting to a non-ordering traffic pattern (e.g., a sequential pattern such as that depicted in FIG. 2).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
   implementing, on an optical network, one or more indicators to specify traffic ordering associated with an optical networking protocol;
   ordering traffic, on an optical network, according to the one or more indicators;
   wherein the ordering comprises sending data on a first set of non-contiguous timeslots;
   sending data over a second set of non-contiguous timeslots in response to a protection event in a portion of the optical network associated with the first set of non-contiguous timeslots;
   sending pseudo random data on the first set of non-contiguous time slots in response to the protection event; and
   configuring receiving nodes to ignore the pseudo random data.

2. The method of claim 1 wherein the one or more indicators are implemented in a synchronous optical networking bi-directional line switched ring based network utilizing unused overhead bits.

3. The method of claim 2 wherein the traffic ordering comprises:
   configuring a first set of multiplexed time slots to transmit data; and
   configuring a second set of multiplexed time slots as reserved time slots.

4. The method of claim 3 wherein the first set of multiplexed time slots comprise one or more synchronous transport signal level 1 channels to transmit data around a synchronous optical networking ring; and
   the second set of multiplexed time slots comprise one or more synchronous transport signal level 1 channels that are reserved to transmit data around the synchronous optical networking ring in response to a protection switch.

5. The method of claim 3 wherein the traffic ordering is fixed.

6. The method of claim 3 where the traffic ordering varies.

7. The method of claim 2 further comprising:
   implementing one or more encryption indicators to specify encryption associated with payload data; and
   encrypting the payload data.

8. The method of claim 7 wherein the encryption varies in response to a protection switch.

9. A system comprising:
   a security protocol module that implements one or more security protocols for managing traffic ordering in an optical network;
   wherein the one or more security protocols are implemented within an optical networking protocol and the traffic ordering is altered from a contiguous ordering scheme associated with the optical networking protocol to a scheme in which data is transmitted on a first set of non-contiguous timeslots;
   the security protocol module being further configured to:
      send data over a second set of non-contiguous timeslots in response to a protection event in a portion of the optical network associated with the first set of non-contiguous timeslots;
      send pseudo random data on the first set of non-contiguous time slots in response to a protection event; and
      configure receiving nodes to ignore the pseudo random data.

10. The system of claim 9 wherein the security module implements the one or more security protocols in a synchronous optical networking bi-directional line switched ring based network utilizing unused overhead bits.

11. The system of claim 9 wherein the traffic ordering configures synchronous transport signal level 1 channels in a first and a second direction around a synchronous optical networking ring based on the one or more security protocols.

12. The system of claim 9 wherein the traffic ordering is fixed.

13. The system of claim 9 wherein the traffic ordering varies.

14. The system of claim 9 wherein the security module encrypts payload data.

15. The system of claim 9, further comprising:
   sending pseudo random data through the portion of the network associated with a protection switch; and
   configuring one or more receiving nodes to ignore the pseudo random data.

* * * * *